United States Patent [19]

Lohmeyer

[11] 4,138,160
[45] Feb. 6, 1979

[54] SIMULATED KNOCK OFF SPINNER NUT AND ADAPTER

[75] Inventor: Kurt W. Lohmeyer, Fullerton, Calif.

[73] Assignee: Tru-Spoke, Inc., Anaheim, Calif.

[21] Appl. No.: 811,044

[22] Filed: Jun. 29, 1977

[51] Int. Cl.² ............................................. B60B 7/06
[52] U.S. Cl. ............................ 301/108 S; 301/108 SC
[58] Field of Search ............. 301/37 S, 37 SC, 108 S, 301/108 SC; 285/370, 397, 404; 403/299, 362

[56] References Cited

U.S. PATENT DOCUMENTS

| 1,025,759 | 5/1912 | McCluskey | 285/397 X |
| 1,386,784 | 8/1921 | Johnston | 301/37 S |
| 1,985,681 | 12/1934 | Miller | 301/37 S X |
| 3,101,960 | 8/1963 | Danescu | 285/404 X |

FOREIGN PATENT DOCUMENTS 421139 11/1925 Fed. Rep. of Germany .... 301/108 SC
252274 3/1927 Italy ...................................... 301/37 SC

OTHER PUBLICATIONS

Honest Charley Catalog: 19CRR, 1963, 2/3, p. 4.

*Primary Examiner*—Allen N. Knowles
*Assistant Examiner*—Charles A. Marmor
*Attorney, Agent, or Firm*—Gerald L. Price

[57] ABSTRACT

A simulated knock off wheel spinner nut and adapter for attaching the nut to a wheel without having to remove the wheel from the vehicle. The adapter is sized to be inserted into the hub opening of the wheel and then locked in position by tightening a plurality of outwardly extending set screws located about the circumference of the adapter into the inside wall of the hub opening. The adapter is further provided with threads to receive the simulated spinner nut.

6 Claims, 3 Drawing Figures

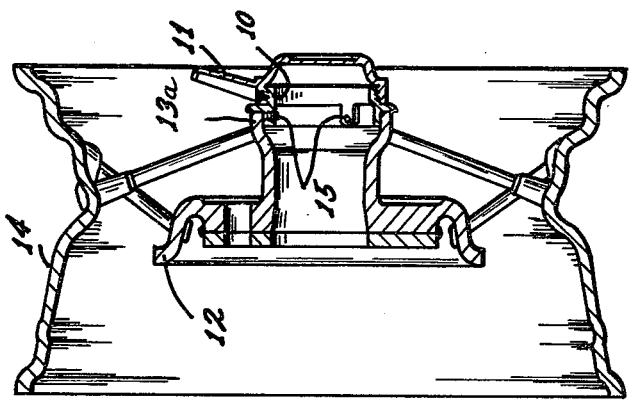
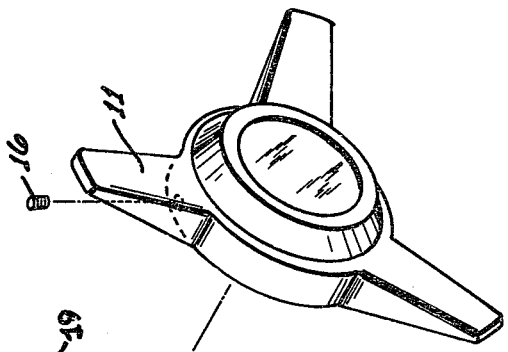
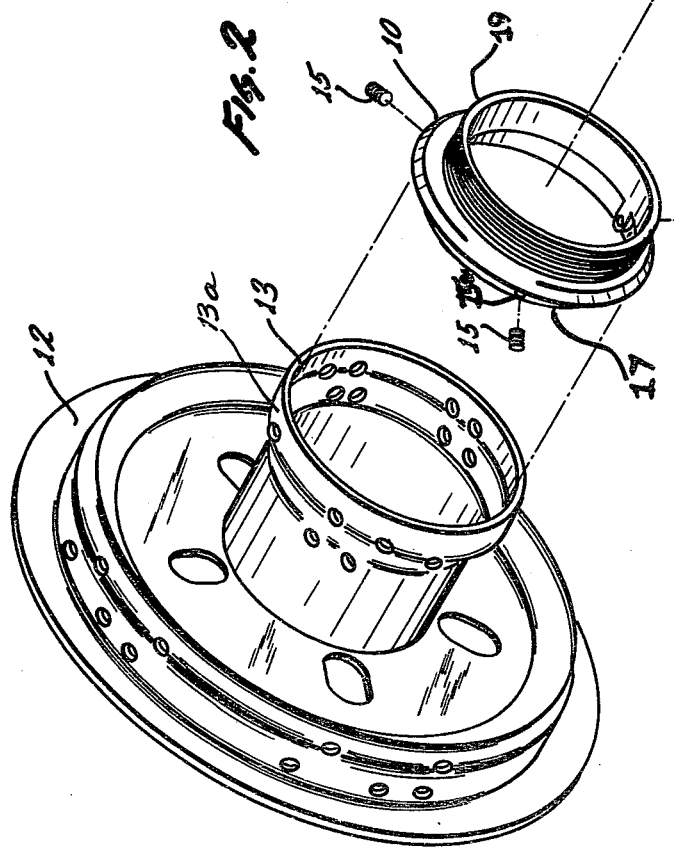

SIMULATED KNOCK OFF SPINNER NUT AND ADAPTER

BACKGROUND OF THE INVENTION

The present invention relates generally to simulated knock off wheel spinner nuts and more particularly to an improved spinner nut and adapter which enables a simulated spinner nut to be readily and permanently installed on an existing wheel without the necessity of removing the wheel from the vehicle.

Automobile wheels held in place by spinner nuts are a well known and familiar sight among racing and competion vehicles. Additionally, a number of sports cars both imported and domestic have been provided with wire wheels or light alloy wheels which are mounted on the vehicle by spinner nuts. Wheels of this type are commonly referred to as knock off wheels and a number of conventional automobiles have been provided with as original equipment hub caps employing a simulated spinner nut to impart a sporty or competition appearance to the vehicle. Additionally, simulated spinner nut hub caps and simulated spinner nut assemblies have been sold as add on automobile accessories. While a number of such products have enjoyed success, in general they do not present an authentic appearance and are readily susceptible to vandalism and theft.

SUMMARY OF THE INVENTION

Accordingly, it is the general aim of the present invention to provide a new and improved simulated spinner nut and adapter which is far more realistic in appearance and easier to install than has heretofore been possible. A related object of the invention is to provide an improved simlated spinner nut and adapter which can be securely installed to a mounted vehicle wheel without the necessity of removing the wheel from the vehicle. A still further object of the invention is to provide a simulated spinner nut and adapter for a vehicle wheel which is highly resistant to vandalism and theft.

While the present invention is concerned with the provision of a new and improved simulated spinner nut and adapter, it is nevertheless, an object of the invention to provide an improved simulated spinner nut and mounting adapter which is made of a minimum of parts thus simplifying the manufacturing and packaging together with the installation of same.

BRIEF DESCRIPTION OF THE DRAWINGS

Other objects and advantages of the present invention, along with the interrelationship between the elements of the preferred embodiment, will become more apparent when considered in connection with the specification and accompanying drawings in which:

FIG. 1 is a side elevation, partly in section, of an exemplary simulated wheel spinner and adapter embodying the features of the present invention illustrating the simulated spinner nut and adapter mounted on a vehicle wheel;

FIG. 2 is an exploded perspective view of the simulated spinner nut and adapter of the present invention together with the hub portion of a vehicle wheel; and FIG. 3 is an enlarged fragmentary section of the spinner nut, adapter, and vehicle hub illustrated in FIG. 1.

While the present invention is susceptible of various modifications and alternative constructions and can be used with various types of materials and overally designs, illustrative embodiments are shown in the drawings and will hereinafter be described in detail. It should be understood, however, that it is not intended to limit the invention to the particular embodiment disclosed, but, on the contrary, the intention is to cover all equivalents and alternative constructions falling within the spirit and scope of the invention as expressed in the appended claims.

DESCRIPTION OF THE PREFERRED EMBODIMENT

Referring now to FIGS. 1 and 2, an exemplary simulated spinner nut mounting adapter generally indicated at 10, is illustrated, together with a simulated spinner nut 11. For the purposes of illustration, the adapter and simulated spinner nut of the present invention are shown in use with a vehicle wheel 14 of the type which is the subject of my U.S. design Pat. No. 241,421 issued Sept. 14, 1976. This wheel is a wire wheel construction which is bolted to the vehicle in the same manner as a conventional automobile wheel.

In accordance with one of the important aspects of the present invention, provision is made for mounting the simulated spinner nut 11 on the wheel 14. This is accomplished by providing a cylindrically shaped adapter 10 which has a forward portion 17 adapted to be slidably inserted into hub portion 13a defining the circular opening 13 of the hub portion 12 of the wheel 14. As shown in FIGS. 1 and 2, the depth to which the first portion of the adapter 10 is inserted into the hub opening 13, is controlled by a second portion 18 of the adapter 10 which serves as a collar and further provides a flush appearance and transition between the adapter 10 and the hub 12 of the wheel.

In order to secure the adapter 10 in place after it is inserted into the opening 13 of the wheel hub 12, the first portion 17 of the adapter which is inserted into the hub opening 13 is provided with three equally spaced threaded holes 15a about its circumference which receive said screws 15. As shown in FIGS. 1 and 3, when said screws 15 are inserted into the threaded holes 15a from the inside of the adapter and outwardly advanced, they will bear against the inside surface of hub opening 13 thereby securely locking the adapter 10 in place in its inserted position in the hub opening 13.

In order to attach the simulated spinner nut 11 to the adapter 10, the outer portion of the adapter 10 is provided with threads 19 adapted to engage corresponding threads within the simulated spinner nut 11 so that the spinner nut can be threadably mounted on the adapter in the same manner as the spinner nut is affixed to a real knock off wheel.

In order to prevent accidental loss or theft of the spinner nut 11, one or more locking set screws 16 can be provided about the circumference of the spinner nut so that when tightened inwardly after the spinner nut is mounted on the adapter 10, they will bear against the threaded portion 19 of the adapter locking the spinner nut 11 in place. As shown in FIG. 3, the locking set screw 16 can be hidden behind the ears of the spinner nuts and if desired can be provided with a set screw requiring an unconventional type of screwdriver or wrench so as to increase the difficulty of an unauthorized removal of the simulated spinner nut.

Having thus described my invention, I claim:

1. For use with a vehicle wheel of the type having a hub provided with a portion defining a circular hub opening including a generally smooth interior sidewall surface portion, a simulated knock off wheel spinner nut and adapter comprising:

a. an adapter having a generally cylindrical cross section with a first generally smooth surface portion sized to be slidably inserted into the circular hub opening of a vehicle wheel and provided with means for securement therein, said adapter including an outer portion distal to said first portion and provided with means for attachment of a simulated spinner nut;

b. a simulated spinner nut with a centrally disposed opening in the rear thereof for reception about said outer distal portion;

c. attachment means for securing said spinner nut to said outer distal portion of said adapter; and d. said adapter further including a shoulder portion between said first portion and said outer distal portion which shoulder portion is of a larger diameter than said first portion and of a diameter larger than said portion defining the circular hub opening and having a generally vertical sidewall adjacent to said first portion adapted to abut the circular hub opening whereby there is provided a flush appearance between the adapter and the hub of the wheel.

2. The apparatus as set forth in claim 1 wherein said first portion of said adapter is provided with a plurality of set screws positioned about the circumference thereof and extending perpendicularly therethrough whereby when said first portion of said adapter is inserted in the opening of the wheel, each of said set screws can be outwardly advanced so that the outer portion of each of said set screws bears against the inner surface of the wheel opening.

3. The apparatus as set forth in claim 2 wherein there are at least three said set screws spaced substantially equally about the circumference of said first portion.

4. The apparatus as set forth in claim 1 wherein said attachment means comprises corresponding threads on said outer distal portion of said adapter and said opening in said simulated spinner nut.

5. The apparatus as set forth in claim 1 wherein said simulated spinner nut has a generally circumferential center portion with said opening defining the interior thereof and at least one set screw threadably mounted in said circumferential portion and passing generally perpendicularly therethrough whereby the inward advancement of said set screws will cause said set screws to bear against said second portion of said adapter thereby locking said simulated spinner nut to said adapter.

6. The apparatus as set forth in claim 4 wherein said simulated spinner nut has a generally circumferential center portion with said opening defining the interior thereof and at least one set screw threadably mounted in said circumferential portion and passing generally perpendicularly therethrough whereby the inward advancement of said set screws will cause said set screws to bear against said second portion of said adapter thereby locking said simulated spinner nut to said adapter.

* * * * *